Patented July 1, 1924.

1,499,798

UNITED STATES PATENT OFFICE.

JEAN D'ANS, OF BERLIN, GERMANY.

PROCESS FOR OXIDIZING ORGANIC SUBSTANCES IN ALKALINE LIQUORS.

No Drawing. Application filed October 10, 1922. Serial No. 593,632.

*To all whom it may concern:*

Be it known that I, JEAN D'ANS, residing at Berlin, N. W., Germany, have invented certain new and useful Improvements in Processes for Oxidizing Organic Substances in Alkaline Liquors, of which the following is a specification.

This invention relates to a process for oxidizing organic substances in alkaline liquors.

It is known that lyes greatly contaminated by organic substances are worked up by condensing the lyes by evaporation, calcining them, applying quicklime to causticize the soda formed, and subjecting the solution of caustic potash thus obtained to further treatment according to the purpose for which it is to be used. The waste liquors of sodium oxide cellulose factories for example are regenerated in this manner. This process, which is the only economical one in cases in which the lyes contain a considerable proportion of organic substances, is not economical when the quantity of organic substance is small in comparison with the quantity of alkali. For such cases a convenient method of destroying the organic substances in the lyes, without having to concentrate them by evaporation or to calcine them, would be useful, and the object of the present invention is to provide a process of this kind which is very cheap and simple.

The process according to the invention is founded on the surprising fact that compounds which contain both chlorine and oxygen (chlorates being a particular instance of such compounds), are capable of oxidizing organic substances, even in strong alkaline solutions, on the application of heat and pressure when assisted by suitable catalyzers. The catalyzers which have up to the present been found effective are the heavy metals, their oxides and salts, and mixtures of these substances. The new process is particularly important for the regeneration of lyes obtained in mercerizing, and in processes for dealing with cellulose. The carbonate of alkali-metal formed can easily be removed by causticizing.

It has also been found that, besides the oxides of chlorine, other oxidizing agents, such as the oxides of nitrogen are also suitable for regenerating lyes contaminated by organic substances. Thus for example the regeneration of caustic soda lyes containing in solution cellulose and derivatives thereof, or other carbohydrates, may also be carried out in accordance with the invention by heating the lyes together with oxides of nitrogen or salts of nitrogen oxygen acids under pressure, while using catalyzers. Agents that can be used for this purpose are for example nitrate of sodium or nitrite.

Although it is known that organic substances can be oxidized by means of chlorates, hypochlorates, etc., in solutions which are neutral or slightly acid with the aid of catalyzers, it is quite astonishing that the reaction also takes place under suitable conditions in such a manner as to be commercially useful in alkaline solutions. The oxidation can be promoted by introducing oxygen or gas mixtures rich in oxygen.

A suitable method of carrying out the process consists in causing the lye to trickle down over the catalyzers in an upright, towerlike autoclave. The trickling process may, if necessary, be repeated several times.

*Example 1.*

A lye of about 14% NaOH containing wood gum substances of cellulose in solution is mixed with a quantity of chlorate of sodium equal to 1½ times the amount of oxidizable organic substance contained in the lye, which is ample for a complete oxidation, and heated for about 4 hours up to 140 to 180° C. while using copper wire netting as a catalyzer.

*Example 2.*

A lye of about 14% NaOH containing wood gum substances of cellulose in solution is mixed with a quantity of nitrate of sodium equal to 1½ times the amount of oxidizable organic substance container in the lye, which is ample for a complete oxidation, and heated for about 4 hours up to 140 to 180° C., while using carbon and iron oxide as a catalyzer.

I claim:—

1. Process for oxidizing organic substances in alkaline lyes, which consists in heating an alkaline lye together with an oxidizing agent under pressure in the presence of a catalyzer.

2. Process for oxidizing organic substances in alkaline lyes consisting in heating the lyes together with compounds which contain both chlorine and oxygen, under pressure in the presence of catalyzers.

3. Process for oxidizing organic substances in alkaline lyes consisting in heating the lyes together with compounds which contain both chlorine and oxygen, under pressure in the presence of catalyzers, and in assisting the oxidation by introducing oxygen.

4. Process for oxidizing organic substances in alkaline lyes consisting in heating the lyes together with compounds which contain both chlorine and oxygen, under pressure in the presence of catalyzers, the lye being caused to trickle down over the catalyzers in an upright autoclave.

5. Process for oxidizing organic substances in alkaline lyes consisting in heating the lyes together with compounds which contain both chlorine and oxygen, under pressure in the presence of catalyzers, and in assisting the oxidation by introducing oxygen, the lye being caused to trickle down over the catalyzers in an upright autoclave.

6. Process for oxidizing organic substances in alkaline lyes consisting in heating the lyes together with compounds which contain both chlorine and oxygen, under pressure in the presence of catalyzers, the lye being caused to trickle down over the catalyzers in an upright tower-like autoclave.

7. Process for oxidizing organic substances in alkaline lyes, which consists in heating an alkaline lye together with an oxidizing agent under pressure in the presence of a catalyzer, and introducing oxygen in addition to said oxidizing agent, to promote oxidation.

8. Process for oxidizing organic substances in alkaline lyes, which consists in heating an alkaline lye together with an oxidizing agent under pressure in the presence of a catalyzer while causing such lye to trickle over the catalyzer in an upright autoclave.

9. Process for oxidizing organic substances in alkaline lyes, which consists in heating an alkaline lye together with an oxidizing agent and with oxygen additional to such oxidizing agent, under pressure in the presence of a catalyzer, while causing such lye to trickle over the catalyzer in an upright autoclave.

In testimony whereof I affix my signature in presence of two witnesses.

JEAN D'ANS.

Witnesses:
 FRIK LUUND,
 ERNA HENNIG.